United States Patent
Balog et al.

(10) Patent No.: US 11,163,068 B2
(45) Date of Patent: Nov. 2, 2021

(54) GLOBAL NAVIGATION SATELLITE SYSTEM (GNSS) SPOOFING DETECTION AND MITIGATION

(71) Applicant: KVH Industries, Inc., Middletown, RI (US)

(72) Inventors: Robert Balog, Wrentham, MA (US); Michael Simon, Portsmouth, RI (US)

(73) Assignee: KVH Industries, Inc., Middletown, RI (US)

( * ) Notice: Subject to any disclaimer, the term of this patent is extended or adjusted under 35 U.S.C. 154(b) by 314 days.

(21) Appl. No.: 16/367,772

(22) Filed: Mar. 28, 2019

(65) Prior Publication Data
US 2019/0302272 A1    Oct. 3, 2019

Related U.S. Application Data

(60) Provisional application No. 62/650,058, filed on Mar. 29, 2018.

(51) Int. Cl.
*G01S 19/21*    (2010.01)
*G01S 19/49*    (2010.01)

(52) U.S. Cl.
CPC ............ *G01S 19/215* (2013.01); *G01S 19/49* (2013.01)

(58) Field of Classification Search
CPC ........ G01S 19/215; G01S 19/49; G01S 19/21; G01S 19/30; G01S 19/32; G01S 19/36
(Continued)

(56) References Cited

U.S. PATENT DOCUMENTS 5,583,744 A    12/1996   Diesel
6,122,572 A *  9/2000    Yavnai ............... G05D 1/0088
                                                 342/13

(Continued)

FOREIGN PATENT DOCUMENTS

WO    2016153435 A1    9/2016

OTHER PUBLICATIONS

PCT International Preliminary Report on Patentability for International Application No. PCT/US2019/024484 dated Sep. 29, 2020 entitled "Global Navigation Satellite System (GNSS) Spoofing Detection & Mitigation".

(Continued)

*Primary Examiner* — Harry K Liu
(74) *Attorney, Agent, or Firm* — Hamilton, Brook, Smith & Reynolds, P.C.

(57) ABSTRACT

A method of detecting and mitigating Global Navigation Satellite System (GNSS) spoofing events may comprise determining a first vehicle state based on an Inertial Navigation System (INS) without GNSS input, determining a second vehicle state based on an INS with GNSS input, and comparing the first vehicle states. When a difference between the vehicle states exceeds a predetermined threshold, the method concludes that GNSS spoofing is present, and utilizes only the first vehicle state as a correct vehicle state. The method may further implement at least one state processing path, comprising consecutive processing runs based on INS sensors. The method may further comprise reevaluating the vehicle state processing path, when the difference between the first vehicle state and the second vehicle state exceeds a threshold, to extricate a GNSS component from the processing path to at least a predetermined amount of time prior to when the GNSS spoofing was detected.

20 Claims, 14 Drawing Sheets
(2 of 14 Drawing Sheet(s) Filed in Color)

(58) Field of Classification Search
USPC .................................................. 342/357.59
See application file for complete search history.

(56) References Cited

U.S. PATENT DOCUMENTS

| | | | |
|---|---|---|---|
| 2009/0254278 A1* | 10/2009 | Wang | G01S 19/215 |
| | | | 701/472 |
| 2013/0002477 A1* | 1/2013 | Dehnie | G01S 19/47 |
| | | | 342/357.3 |
| 2016/0377726 A1 | 12/2016 | Schipper | |
| 2017/0227650 A1* | 8/2017 | Grobert | H04K 3/90 |
| 2021/0088672 A1 | 3/2021 | Balog | |

OTHER PUBLICATIONS

International Search Report and Written Opinion for PCT/US2019/024484 dated Sep. 27, 2019 entitled "Global Navigation Satellite System (GNSS) Spoofing Detection & Mitigation".

* cited by examiner

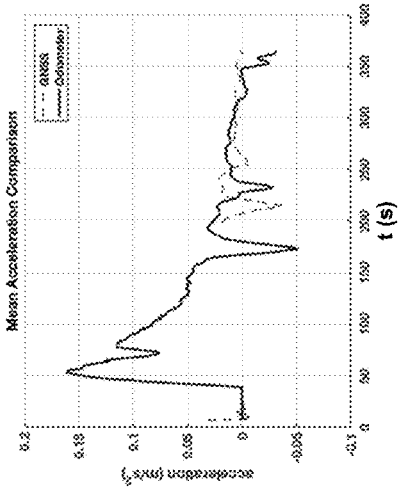
FIG. 4A
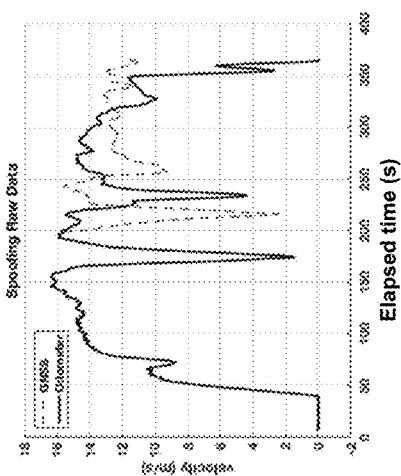
FIG. 4C
FIG. 4E
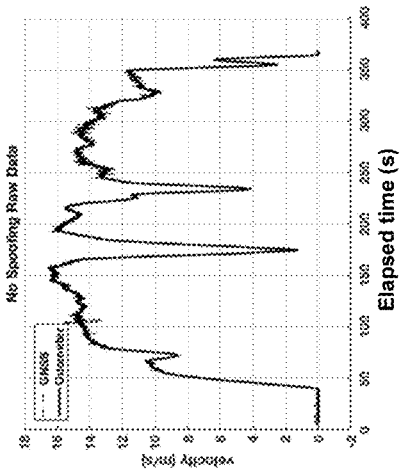
FIG. 4B
FIG. 4D
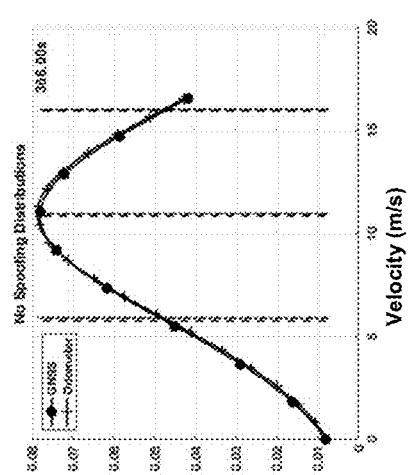
FIG. 4F

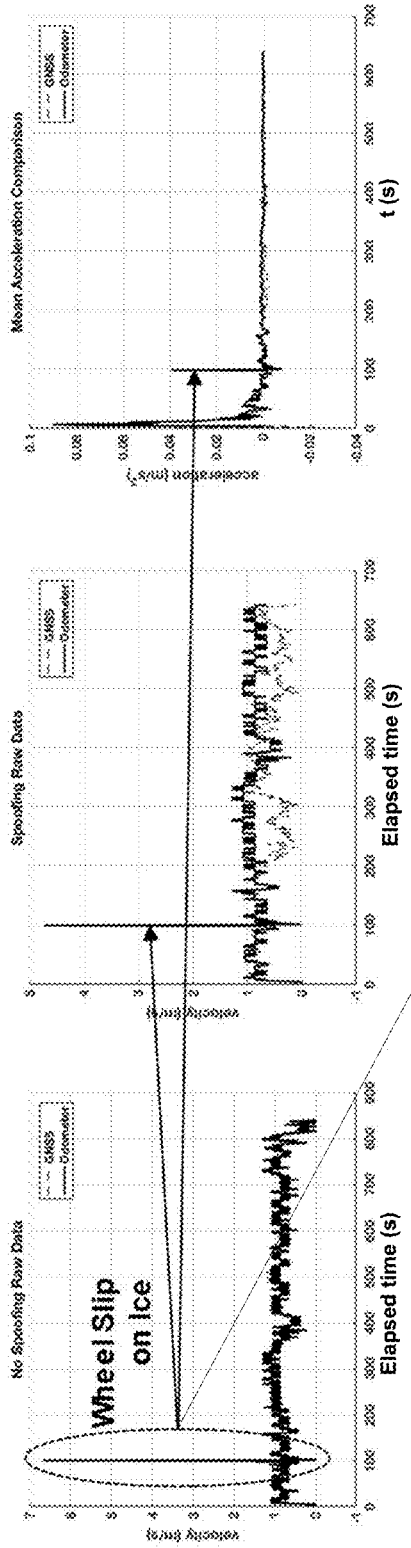
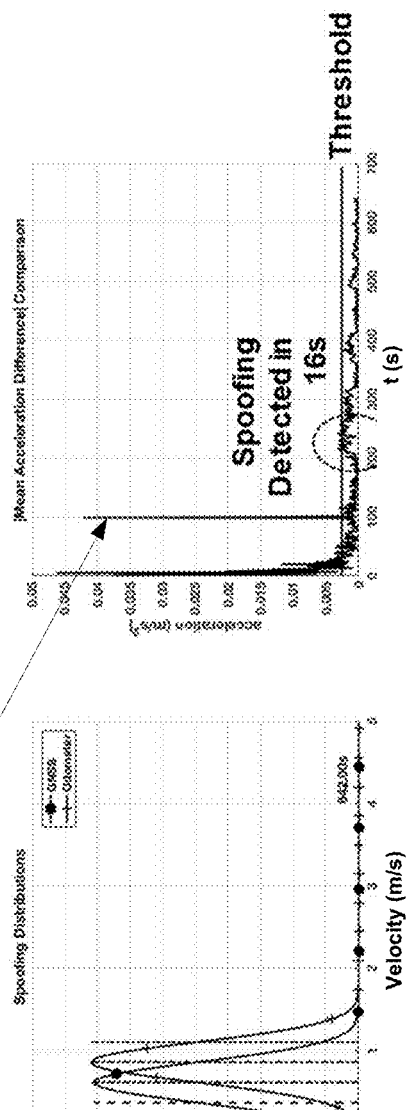
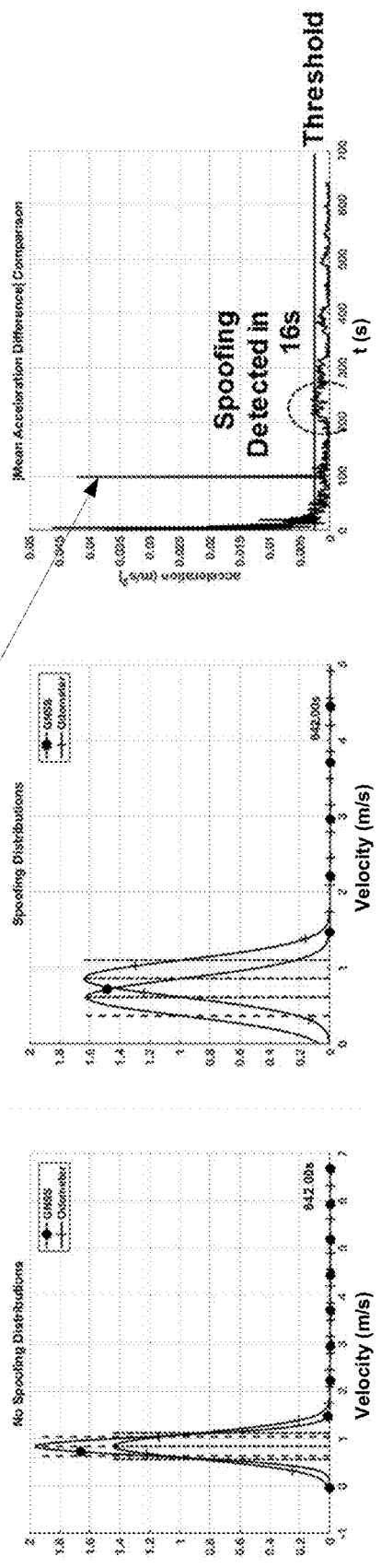
FIG. 6A  FIG. 6C  FIG. 6E
FIG. 6B  FIG. 6D  FIG. 6F

GLOBAL NAVIGATION SATELLITE SYSTEM (GNSS) SPOOFING DETECTION AND MITIGATION

RELATED APPLICATION

This application claims the benefit of U.S. Provisional Application No. 62/650,058, filed on Mar. 29, 2018. The entire teachings of the above application(s) are incorporated herein by reference.

BACKGROUND

Global Navigation Satellite System (GNSS) is a system of satellites that provide autonomous geo-spatial positioning with global coverage. A GNSS receiver may utilize signals transmitted from one or more of the GNSS satellites to determine its location (e.g., longitude, latitude, and altitude/elevation). GNSS spoofing refers to any alteration or denial of the true GNSS signal reception by intended GNSS receivers such as, but not limited to, intentional position, velocity, and heading error introduction, GNSS signal jamming, among others.

SUMMARY

The described embodiments are directed to one or more of a method, a device, and a system for detecting and mitigating Global Navigation Satellite System (GNSS) spoofing by comparing a vehicle state determined by one or more Inertial Navigation Systems (INSs) without GNSS information (INS vehicle state or IVS), to the vehicle state determined by one or more INSs with GNSS Information (GNSS vehicle state or GVS). The described embodiments compare IVS and GVS statistics to detect and mitigate GNSS spoofing. The described embodiments may employ a control system, which may be a processor-based system, hosted either on-board or off-board the vehicle or both, configured to execute a high-level control algorithm to generate the vehicle state statistics, perform the vehicle state comparison, and detect GNSS spoofing, and generate a mitigation solution. As used herein, the term "vehicle state" refers to navigational parameters associated with the vehicle, including, but not limited to, position (e.g., latitude and longitude), velocity, acceleration, altitude and/or elevation, heading, orientation, among others.

In one aspect, the invention may be a method of detecting and mitigating Global Navigation Satellite System (GNSS) spoofing events. The method may comprise determining a first vehicle state based on information from an Inertial Navigation System (INS) without GNSS input, determining a second vehicle state based on information from an INS with GNSS input, and comparing the first vehicle state and the second vehicle state. The method may further comprise, when a difference between the first vehicle state and the second vehicle state exceeds a predetermined threshold, concluding that GNSS spoofing is present and utilizing only the first vehicle state as a correct vehicle state.

The method may further comprise implementing at least one vehicle state processing path. Each of the at least one vehicle state processing path may comprise two or more consecutive processing runs based on INS sensor information.

The method may further comprise initializing each of the two or more consecutive processing runs with the GNSS input.

The method may further comprise reevaluating at least one vehicle state processing path, when the difference between the first vehicle state and the second vehicle state exceeds a predetermined threshold, to extricate a GNSS component from the processing path to at least a predetermined amount of time prior to when the GNSS spoofing was concluded to be present.

The at least one vehicle state processing path may be a first processing path and a second processing path, the first processing path staggered in time with respect to the second processing path.

The method may further comprise, at a vehicle, transmitting (i) the information from the INS without GNSS input, and (ii) the information from the INS with GNSS input, to an off-board control subsystem. The method may further comprise, at the off-board control subsystem, determining the first vehicle state and the second vehicle state, comparing the first vehicle state and the second vehicle state, and when a difference between the first vehicle state and the second vehicle state exceeds a predetermined threshold, determining a result comprising concluding that GNSS spoofing is present, and utilizing only the first vehicle state as a correct vehicle state. The method may further comprise conveying the result to the vehicle.

Concluding that GNSS spoofing is present further may further comprise determining that a running mean acceleration difference between a vehicle odometer-based acceleration measurement and a GNSS-based acceleration measurement exceeds a predetermined threshold.

In another aspect, the invention may be a system for detecting and mitigating Global Navigation Satellite System (GNSS) spoofing events. The system may be a processor and a memory with computer code instructions stored thereon. The memory may be operatively coupled to the processor such that, when executed by the processor, the computer code instructions cause the system to determine a first vehicle state based on information from an Inertial Navigation System (INS) without GNSS input, determine a second vehicle state based on information from an INS with GNSS input, and compare the first vehicle state and the second vehicle state. When a difference between the first vehicle state and the second vehicle state exceeds a predetermined threshold, the system may conclude that GNSS spoofing is present, and utilize only the first vehicle state as a correct vehicle state.

The executed code instructions may further cause the system to implement at least one vehicle state processing path, each of the at least one vehicle state processing path comprising two or more consecutive processing runs based on INS sensor information.

The executed code instructions may further cause the system to initialize each of the two or more consecutive processing runs with the GNSS input.

The executed code instructions may further cause the system to reevaluate at least one vehicle state processing path, when the difference between the first vehicle state and the second vehicle state exceeds a predetermined threshold, to extricate a GNSS component from the processing path to at least a predetermined amount of time prior to when the GNSS spoofing was concluded to be present.

The at least one vehicle state processing path may be instantiated as a first processing path and a second processing path, the first processing path staggered in time with respect to the second processing path.

The information from the INS without GNSS input, and the information from the INS with GNSS input, may be determined at the vehicle. The vehicle may transmit the information from the INS without GNSS input, and the information from the INS with GNSS input, to the off-board control subsystem. The off-board control subsystem may (a) determine the first vehicle state and the second vehicle state, and compare the first vehicle state and the second vehicle state. When a difference between the first vehicle state and the second vehicle state exceeds a predetermined threshold, the off-board control subsystem may determine a result comprising concluding that GNSS spoofing is present and utilizing only the first vehicle state as a correct vehicle state. The off-board control subsystem may further convey the result to the vehicle.

The system may conclude that GNSS spoofing is present by a determination that a running mean acceleration difference between a vehicle odometer-based acceleration measurement and a GNSS-based acceleration measurement exceeds a predetermined threshold.

In another aspect, the invention may be a non-transitory computer-readable medium with computer code instruction stored thereon. The computer code instructions, when executed by a processor, cause an apparatus to determine a first vehicle state based on information from an Inertial Navigation System (INS) without GNSS input, determine a second vehicle state based on information from an INS with GNSS input, and compare the first vehicle state and the second vehicle state. When a difference between the first vehicle state and the second vehicle state exceeds a predetermined threshold, the computer code instructions, when executed by the processor, may cause the apparatus to conclude that GNSS spoofing is present and utilize only the first vehicle state as a correct vehicle state.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

FIGS. 4A-4G depict a simulation example using real-world vehicle sensor and GNSS data.

FIGS. 6A-6G show results from a second spoofing simulation using real-world vehicle sensor and GNSS data.

DETAILED DESCRIPTION

A description of example embodiments follows.

The teachings of all patents, published applications and references cited herein are incorporated by reference in their entirety.

The described embodiments are directed to one or more of a method, a device, and a system for detecting and mitigating Global Navigation Satellite System (GNSS) spoofing by comparing a vehicle state determined by one or more Inertial Navigation Systems (INSs) without GNSS information (INS vehicle state or IVS), to the vehicle state determined by one or more INSs with GNSS Information (GNSS vehicle state or GVS). The described embodiments compare IVS and GVS statistics to detect and mitigate GNSS spoofing. The described embodiments may employ a control system, which may be a processor-based system, hosted either on-board or off-board the vehicle or both, configured to execute a high-level control algorithm to generate the vehicle state statistics, perform the vehicle state comparison, and detect GNSS spoofing, and generate a mitigation solution. As used herein, the term "vehicle state" refers to navigational parameters associated with the vehicle, including, but not limited to, position (e.g., latitude and longitude), velocity, acceleration, altitude and/or elevation, heading, orientation, among others.

As used herein, the term "on-board" means that sensors and high-level processing and control system components may be hosted on or within the vehicle. As used herein, the term "off-board" means that sensors and high-level processing and control system components may be hosted on system components distinct from the vehicle. As used herein, the term "vehicle" means any category of platform, mobile or stationary, terrestrial, marine, undersea, air, or space borne asset such as, but not limited to, an automobile, a truck, a submarine, an aircraft, a satellite, among other platforms known in the art. INS sensors may comprise components such as odometers, accelerometers, compasses, among other sensors known in the art. Such INS sensor(s) may be located on-board the vehicle, although auxiliary sensors may be located off-board the vehicle, instead of or in addition to the on-board INS sensors. Auxiliary sensors may include, but are not limited to, visible light sensors (e.g., still or video camera devices), infrared sensors, LIDAR, sonar, among other sensors known in the art.

Figure 1A:
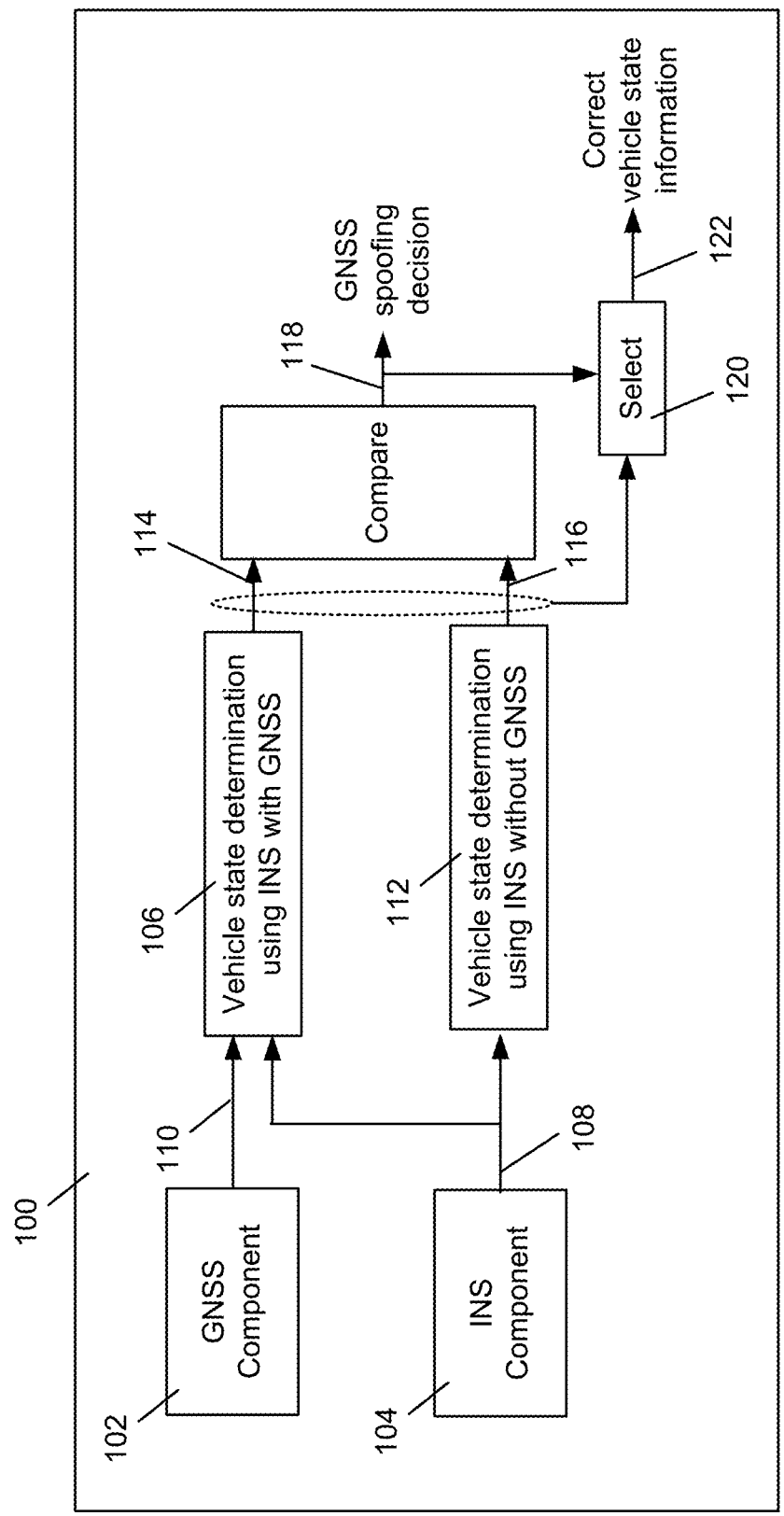
FIG. 1A shows a block diagram of an example embodiment on-board processing system according to an aspect of the invention.

FIG. 1A shows a block diagram of an example embodiment on-board processing system 100 according to an aspect of the invention. The system 100 may comprise a GNSS component 102 and an INS component 104. The GNSS component may comprise a GNSS receiver/processor, along with necessary auxiliary components such as an antenna and associate transmission paths. The INS component may comprise various INS sensors (e.g., accelerometers, gyroscopes, odometer, among others). A first processing path 106 determines the vehicle state using the INS-based vehicle state information 108 combined with the GNSS-based vehicle state information 110. A second processing path 112 determines the vehicle state using the INS-based vehicle state information 108 alone. The resulting INS with GNSS state determination 114 and the INS without GNSS state determination 116 are compared, and the comparison is used to produce a GNSS spoofing decision 118 as described herein. A selection block 120 (essentially a switch) uses the GNSS spoofing decision 118 to select one of either the INS with GNSS state determination 114 or the INS without GNSS state determination 116 as the correct vehicle state information 122.

In an embodiment, where the processor-based control system is arranged in an off-board hosting scenario, the sensor and GNSS states may be transmitted from the vehicle to an off-board control subsystem component. The off-board control subsystem component may (i) determine GNSS and INS vehicle state statistics based on the sensor and GNSS states received from the vehicle, (ii) generate a detection and mitigation solution based on the GNSS and INS vehicle states statistics, and (iii) transmit the detection and mitigation solution back to the vehicle. This embodiment is simple, robust, and does not require complex nulling antennas or any reliance on interpreting the quality of the GNSS signal based on its characteristics.

Figure 1B:
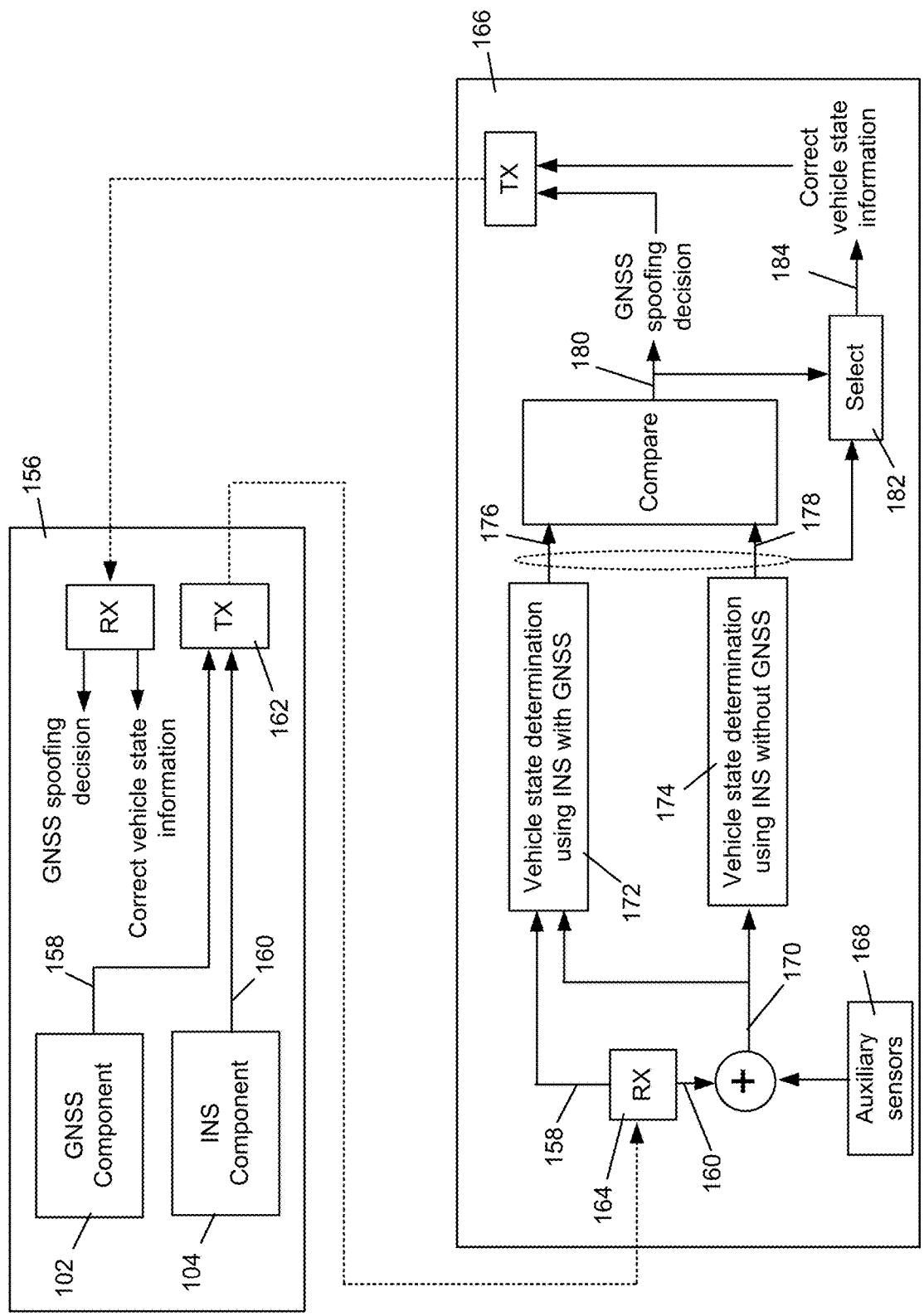
FIG. 1B shows a block diagram of an example embodiment off-board processing system according to an aspect of the invention.

FIG. 1B shows a block diagram of an example embodiment off-board processing system 150 according to an aspect of the invention. The system 150 may comprise a GNSS component 152 and an INS component 154, both located on-board the vehicle 156. The GNSS component may comprise a GNSS receiver/processor, along with necessary auxiliary components such as an antenna and associate transmission paths. The INS component may comprise various INS sensors (e.g., accelerometers, gyroscopes, odometer, among others). The GNSS-based vehicle state information 158 and the INS-based vehicle state information 160 are transmitted 162 to a receiver 164 on an off-board host 166. The INS-based vehicle state information 160 may be combined with information from auxiliary sensors 168 to form augmented INS-based vehicle information 170. A first processing path 172 determines the vehicle state using the augmented INS-based vehicle state information 170 combined with the GNSS-based vehicle state information 158. A second processing path 174 determines the vehicle state using the augmented INS-based vehicle state information 170 alone. The resulting INS with GNSS state determination 176 and the INS without GNSS state determination 178 are compared, and the comparison is used to produce a GNSS spoofing decision 180 as described herein. A selection block 182 (essentially a switch) uses the GNSS spoofing decision 180 to select one of either the INS with GNSS state determination 176 or the INS without GNSS state determination 178 as the correct vehicle state information 184. The correct vehicle state information 184 and the GNSS spoofing decision 180 are transmitted 186 to a receiver 188 on the vehicle 156. This example embodiment presents one example segmentation of components. Other embodiments may distribute the components in a different arrangement across the vehicle 156 and the off-board host.

In general, once GNSS spoofing occurs, there is an immediate change in the statistics for the vehicle state computed with GNSS used in the state computation, compared to the vehicle statistics computed without GNSS input (i.e., using non-GNSS INS sensors). As used herein, the term "state computation" means any navigating technique familiar to those skilled in the art for determining the vehicle state, such as, but not limited to, dead reckoning, Kalman filters, machine learning algorithms, among others.

In one example embodiment, the control system may derive an odometer-based acceleration from an odometer-based velocity, and a GNSS-based acceleration from a GNSS-based velocity. The control system may further determine an absolute value of the running mean acceleration difference between the odometer-based acceleration and the GNSS-based acceleration to detect GNSS spoofing. GNSS spoofing may be indicated when the running mean acceleration difference exceeds a predetermined threshold. The particular value of the predetermined threshold may be dependent on the particular vehicle and the scenario (e.g., road conditions, environmental conditions) in which the vehicle is operating.

In another example embodiment, the controls system may determine heuristics and state statistics to detect spoofing. In yet another embodiment, the controls system may determine an absolute value of the running mean of heading differences between compass and GNSS measured headings to detect spoofing.

The techniques described in these example embodiments are not limited to evaluating position, velocity, and acceleration for vehicle state information, as described above. Embodiments may employ vehicle state data derived from any sensor modality and statistical technique, instead of or in addition to those set forth herein.

Figure 1C:
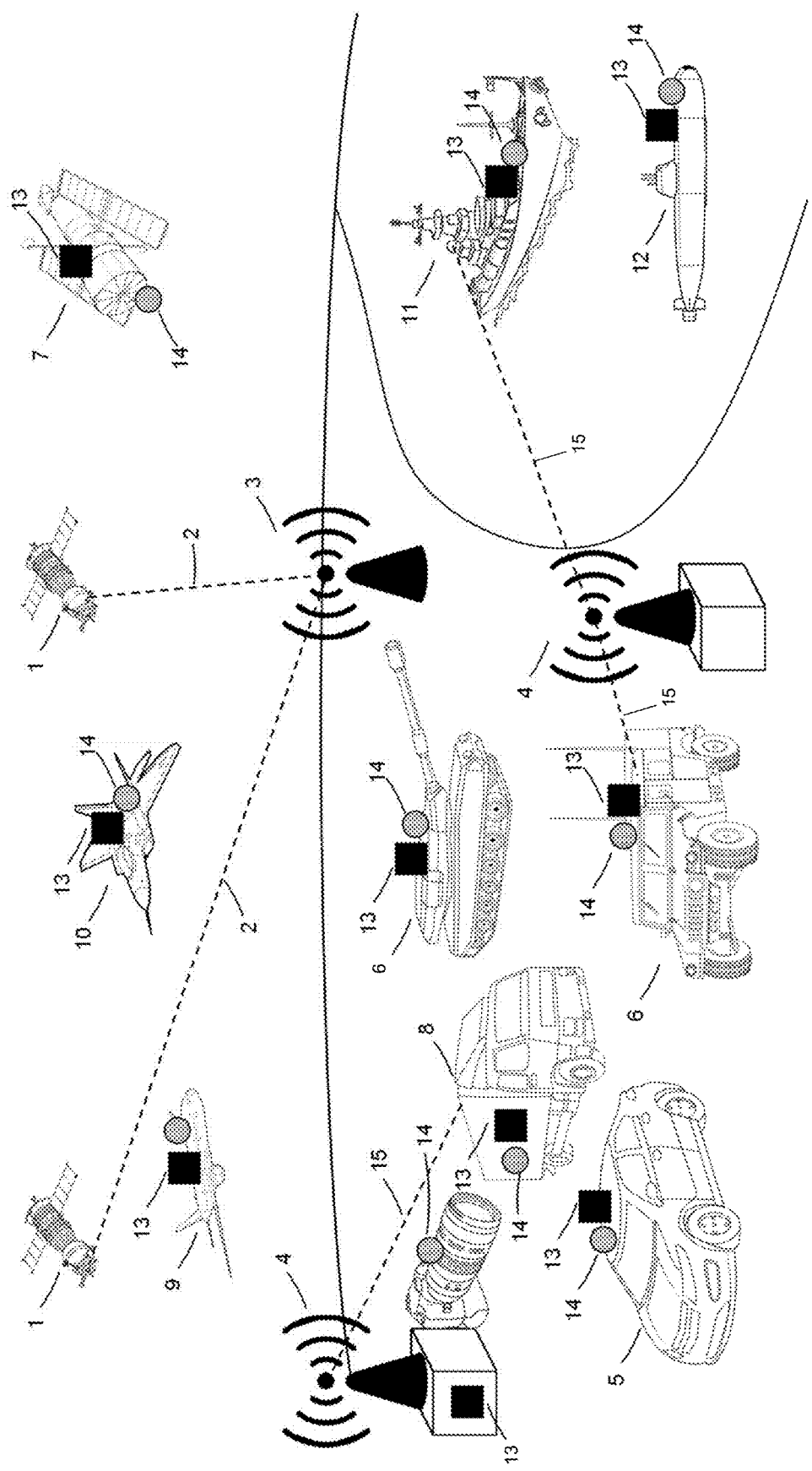
FIG. 1C illustrates a generic example scenario that demonstrates the elements of GNSS spoofing, and the mitigation measures that may be performed by the described embodiments.

FIG. 1C illustrates a generic example scenario that demonstrates the elements of GNSS spoofing, and the mitigation measures that may be performed by the described embodiments. In this example scenario, GNSS satellites 1 transmit GNSS signals 2 to GNSS receivers (not shown) located on GNSS-equipped vehicles (e.g., automobile 5, military vehicle 6, satellite 7, tractor-trailer 8, commercial aircraft 9, military aircraft 10, military surface vessel 11, and submarine 12). GNSS spoofing devices 3 may interfere with the GNSS signals 2 by jamming the GNSS signals 2, generating counterfeit GNSS signals, or both. INS control system components 13 and INS sensors 14 may be either hosted on-board the GNSS-equipped vehicles, or off-board on support vehicles (or stations) 4, or both.

For on-board processing, an on-board control system 13 of a vehicle receives GNSS states from on-board GNSS and receiver and sensor data from on-board sensors 14. The on-board control system 13 determines GNSS and INS vehicle state statistics, and generates a detection decision and mitigation solution for the vehicle.

The support vehicles (and/or stations) 4 may be equipped with control system components 13 configured to provide off-board services to the GNSS-equipped vehicles 5-11. For off-board processing, the GNSS-equipped vehicles 5-11 may transmit 15 sensor data and GNSS states, generated by on-board components, to the support vehicles (or stations) 4. The off-board control system components 13 on the support vehicle (or station) 4 determines GNSS and INS vehicle state statistics for the GNSS-equipped vehicles 5-11 and transmits 15 the detection decision and mitigation solution back to the vehicle.

Figure 2:
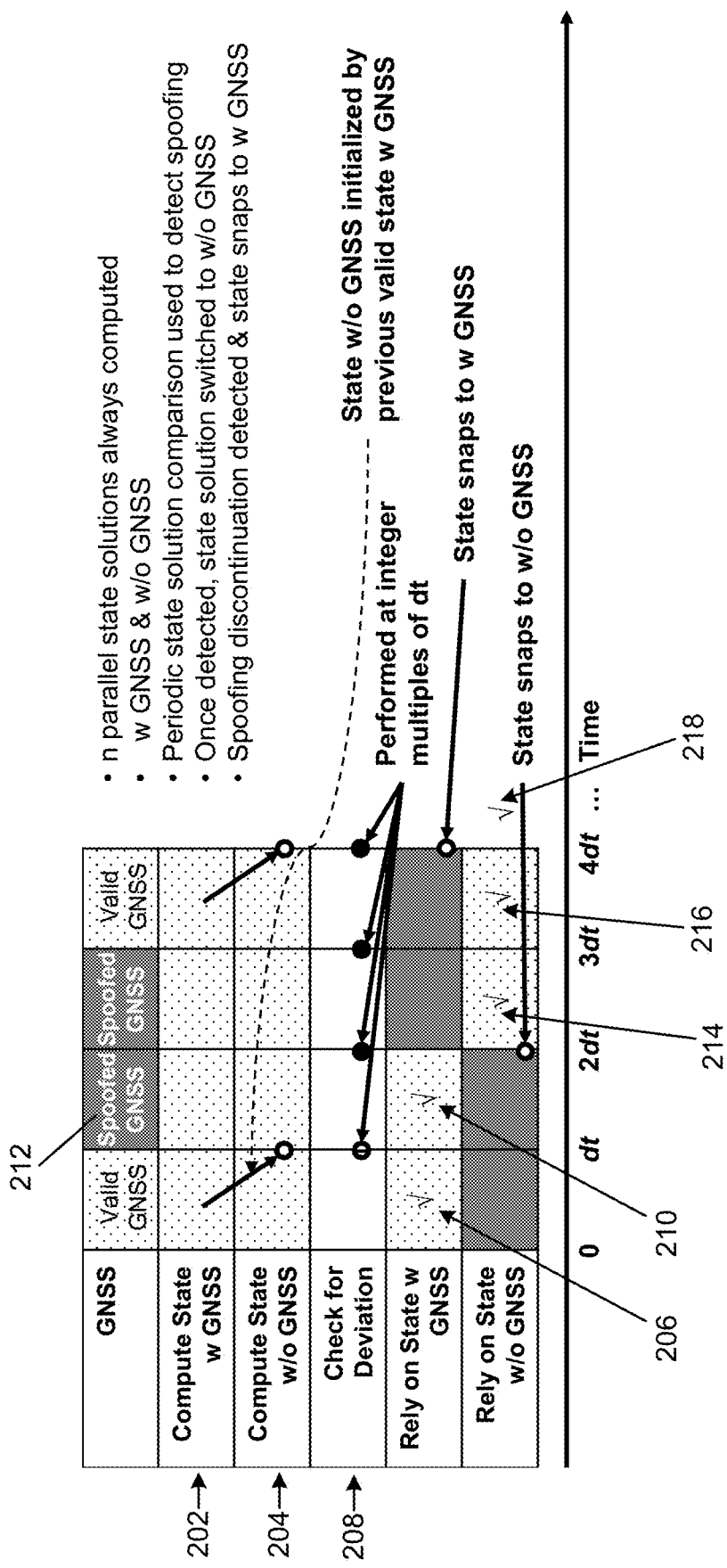
FIG. 2 illustrates an example GNSS spoofing mitigation sequence that the control system may employ to generate a detection and mitigation solution, according to at least one embodiment.

FIG. 2 illustrates an example GNSS spoofing mitigation sequence that the control system may employ to generate a detection and mitigation solution, according to at least one embodiment. For this example, the GNSS input is initially valid at time=0, i.e., the GNSS is not spoofed. The control system may acquire both GNSS and sensor data simultaneously from t=0 to t=dt, where dt is an arbitrary time interval. The control system determines the vehicle state both with GNSS used in the state computation 202 and without GNSS used in the state computation 204. Because GNSS is assumed to be valid in this example during the time interval 0≥t≥dt, the INS navigation solution relies 206 on the computed vehicle state with GNSS during that time interval. State statistics are computed continuously during the time interval.

At time dt, the with GNSS and without GNSS vehicle state statistics are compared (i.e., checked for deviation 208). Since the comparison at time dt relates to conditions during the interval 0≥t≥dt, and no spoofing is present during the interval 0≥t≥dt in this example, the comparison 208 results in a "no spoofing" determination. The "no spoofing" determination causes the without GNSS computation 204 to be initialized according to the current vehicle state with GNSS, and causes the system to rely 210 on the computed vehicle state with GNSS during the time interval dt≥t≥2dt.

During the time interval dt≥t≥2dt, spoofing 210 occurs. At time t=2dt, state statistics are compared 208. Spoofing is detected, so the vehicle state without GNSS is relied upon 214 for vehicle state computation during the interval 2dt≥t≥3dt.

In this example, the spoofing continues during the time interval 2dt≥t≥3dt. At time t=3dt spoofing is discontinued, and during the time interval 3dt≥t≥4dt the control system continues to rely 216 on the vehicle state computed without GNSS. At time 4dt, the state comparison 208 shows that the GNSS state is again valid, i.e., not being spoofed (no spoofing detected during the interval 3dt≥t≥4dt), so the vehicle state computation without GNSS 204 is initialized to the current vehicle state with GNSS, and the vehicle state computed with GNSS is relied upon 218 for future vehicle state determination.

Two simulation examples are presented below to demonstrate the described embodiments. In one example, spoofing is simulated using software. In another example, spoofing is simulated using real-world vehicle sensor and GNSS data.

Figure 3:
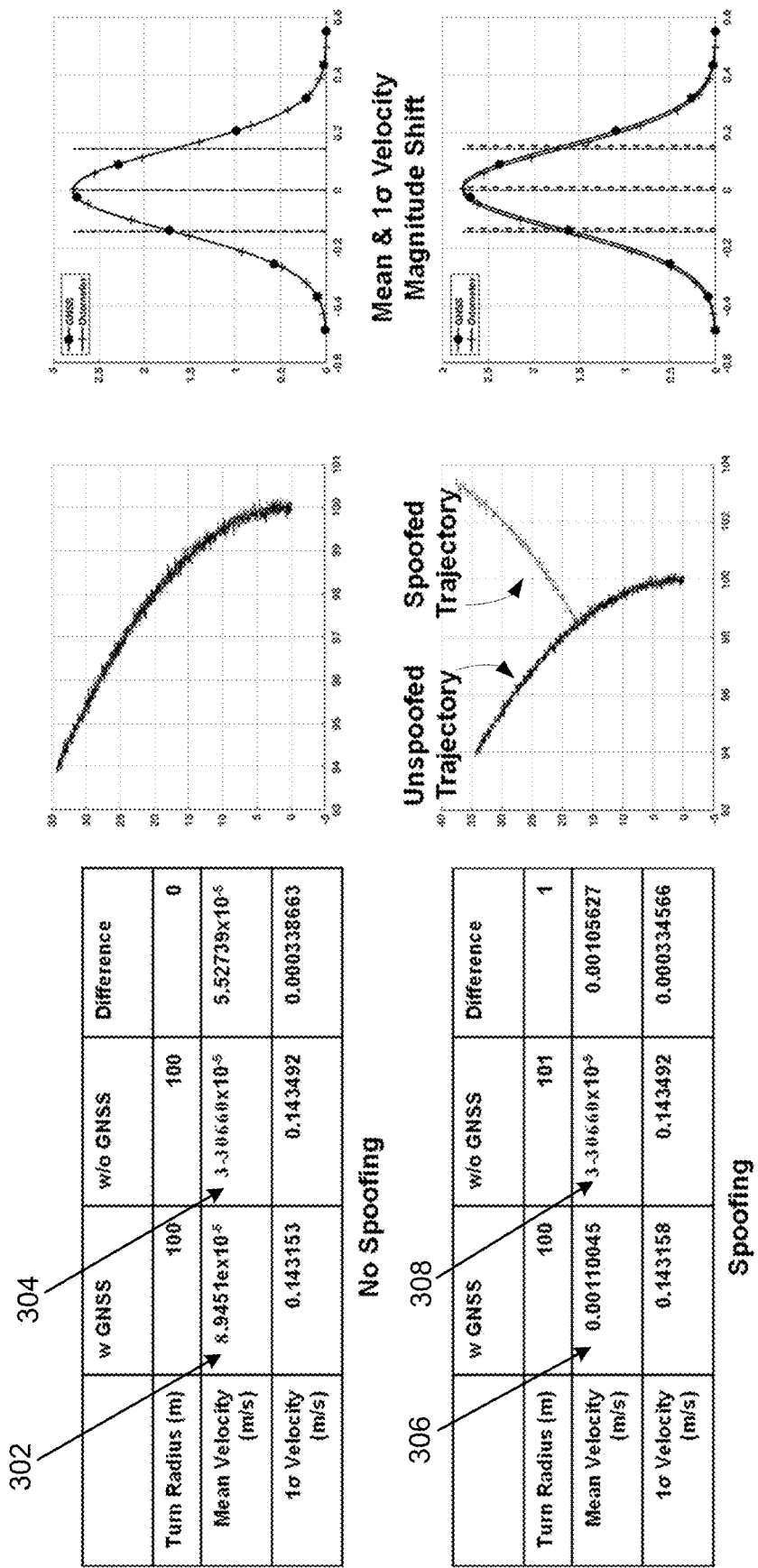
FIG. 3 depicts a software-simulated spoofing example, according to the invention.

FIG. 3 depicts a software-simulated spoofing example. A nominal vehicle trajectory is first prescribed, and then the nominal trajectory is corrupted with random noise to generate an un-spoofed vehicle trajectory. The nominal vehicle trajectory is then altered to generate a spoofed GNSS trajectory, with additional random noise. As FIG. 3 shows, the difference in mean velocities between vehicle state computed with GNSS 302 and without GNSS 304 is very small ($5.52739 \times 10^{-5}$ in this example) when no spoofing occurs. When spoofing occurs, the difference between vehicle state computed with GNSS 306 and without GNSS 308 becomes noticeably larger (in this example 0.00105627). The described embodiments may use this substantial change in the mean velocity to detect the presence of spoofing.

Figure 4G:
Figure 5:
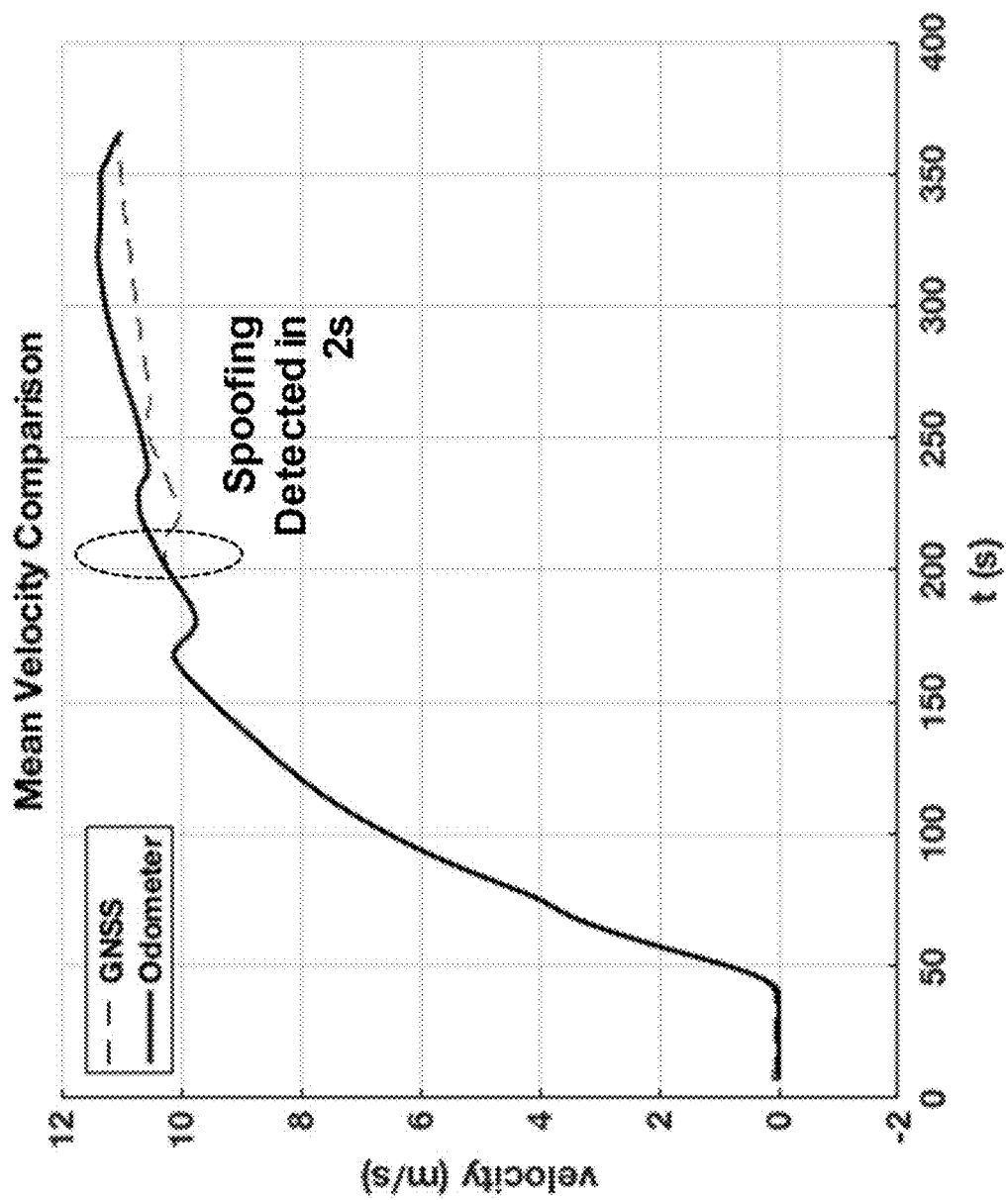
FIG. 5 shows the mean velocity comparison for no spoofing and spoofing over time for the simulation of FIGS. 4A-4G.

FIGS. 4A-4F depict a simulation example using real-world vehicle sensor and GNSS data. A vehicle (a van in this example) is outfitted with a GNSS antenna, odometer, accelerometers, and an INS, and driven on two paved road courses—a short loop and a long loop, as shown in FIG. 4G. The short loop consists of A to B to E to F to A, and the long loop consists of A to B to C to D to E to F to A. Thus, the first and last portions of each road course loop overlap (i.e., A to B, and E to F to A). GNSS and all sensor and INS data is recorded as the vehicle traverses both loops. Spoofing data is simulated by combining measured odometer data from the short loop with measured GNSS data from the first overlapped portion of the short loop with GNSS data from the long loop at loop trajectory deviation. The mean vehicle velocity on the road courses in this example was 11 m/s. The injection time for simulated spoofing was 200 s. FIG. 4A shows raw data with no spoofing (velocity with respect to time), and FIG. 4B shows velocity statistical distribution of velocity for the no spoofing data. FIG. 4C shows raw data with spoofing, and FIG. 4D shows velocity statistical distribution of velocity for the no spoofing data. As can been seen in FIGS. 4B and 4D, the velocity statistical distributions for the spoofing and no spoofing cases are clearly distinct. FIG. 4E shows the mean acceleration comparison (comparing GNSS-based acceleration and odometer-based acceleration), and FIG. 4F plots the mean acceleration difference between GNSS-based acceleration and odometer-based acceleration. FIG. 4F shows that by establishing a spoofing threshold (in this simulation example, about 0.01 m/s$^2$), spoofing was detected in approximately 2 seconds. FIG. 5 shows the mean velocity comparison for no spoofing and spoofing over time.

Figure 6G:
Figure 7:
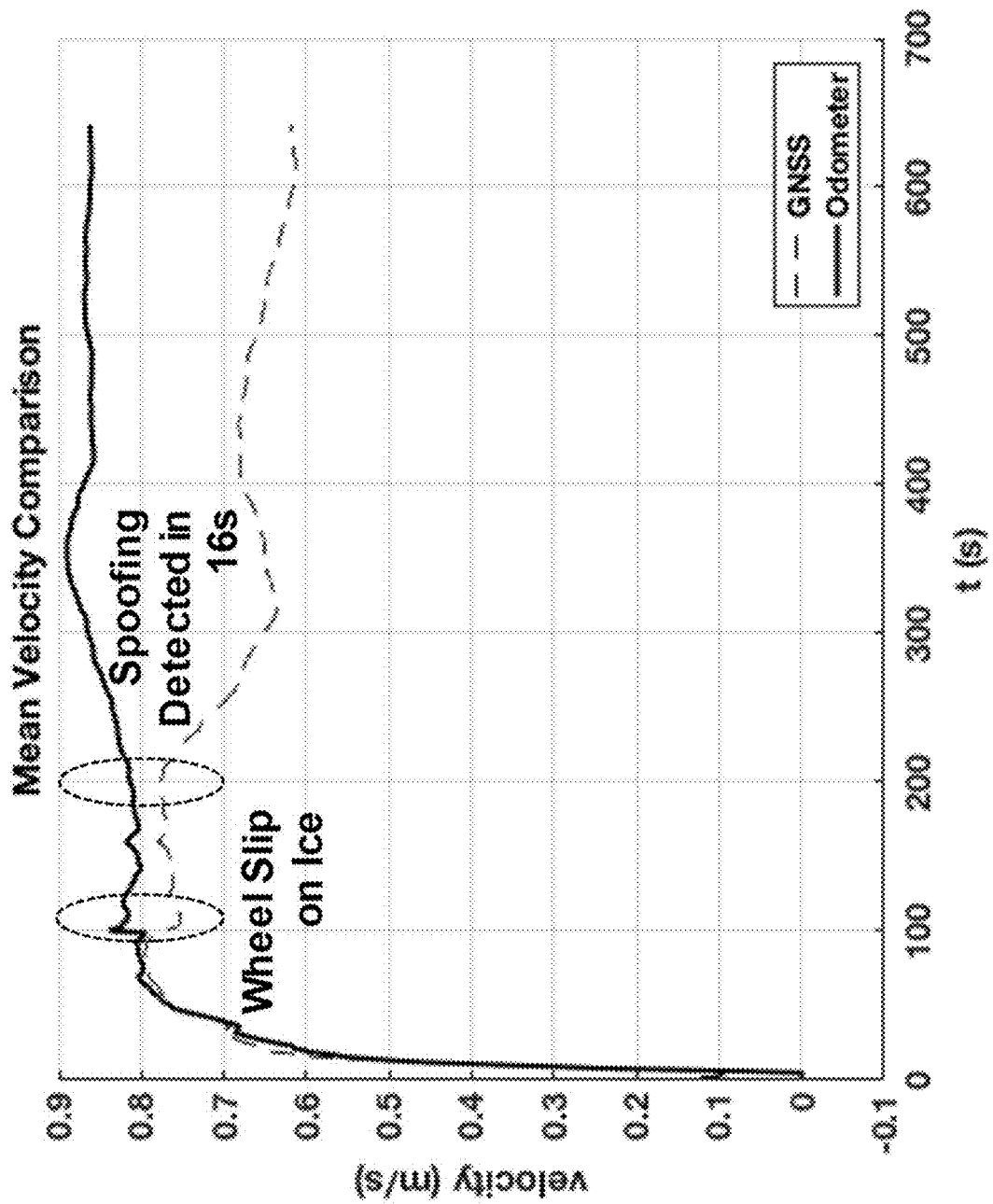
FIG. 7 shows the mean velocity comparison for no spoofing and spoofing over time for the simulation of FIGS. 6A-6G.

FIGS. 6A-6F show results from the second spoofing simulation using real-world vehicle sensor and GNSS data. A vehicle (a van in this case) that was outfitted with a GNSS antenna, odometer, accelerometers, and an INS, was driven on two paved road courses, a short loop and a long loop. The vehicle route is shown in FIG. 6G. The short loop consists of A to B to C to B to A, and the long loop consists of A to B to C to A. Thus the first and last portions of each road course loop overlapped. GNSS and all sensor and INS data were recorded during both loops. Spoofing data was simulated by combining measured odometer data from the short loop with measured GNSS data from the first overlapped portion of the short loop with GNSS data from the long loop at loop trajectory deviation. The mean vehicle velocity on the road courses was 1 m/s. The injection time for simulated spoofing was 200 s. FIG. 6A shows raw data with no spoofing (velocity with respect to time), and FIG. 6B shows velocity statistical distribution of velocity for the no spoofing data. FIG. 6C shows raw data with spoofing, and FIG. 6D shows velocity statistical distribution of velocity for the no spoofing data. As can been seen in FIGS. 6B and 6D, the velocity statistical distributions for the spoofing and no spoofing cases are clearly distinct. FIG. 6E shows the mean acceleration comparison (comparing GNSS-based acceleration and odometer-based acceleration), and FIG. 6F plots the mean acceleration difference between GNSS-based acceleration and odometer-based acceleration. FIG. 6F shows that by establishing a spoofing threshold (in this simulation example, about 0.0025 m/s$^2$), spoofing was detected in approximately 16 seconds. FIG. 7 shows the mean velocity comparison for no spoofing and spoofing over time. Note that a wheel slip on ice occurred during the long loop, but the described embodiments differentiated this ice slip from spoofing based on its large amplitude and transient nature. Embodiments may utilize on-board accelerometers to distinguish between apparent acceleration due to wheel slip and actual acceleration, to filter such wheel slip events from the spoofing detection analysis.

As described herein, GNSS spoofing corrupts vehicle state information that was determined using GNSS as an input. To mitigate the effect of the GNSS spoofing on the GNSS-based state computation, upon detection of GNSS spoofing the control system may "rewind" the GNSS-based vehicle state back to the actual time of the spoofing detection. The control system may then propagate the computed vehicle state forward in time, without GNSS input, from the detection point forward (or from some predefined point in time prior to the detection point forward). Sensor data for an arbitrary number of time intervals, n, may be held in control system memory to accommodate the predefined point in time prior to spoofing detection.

Figure 8A:
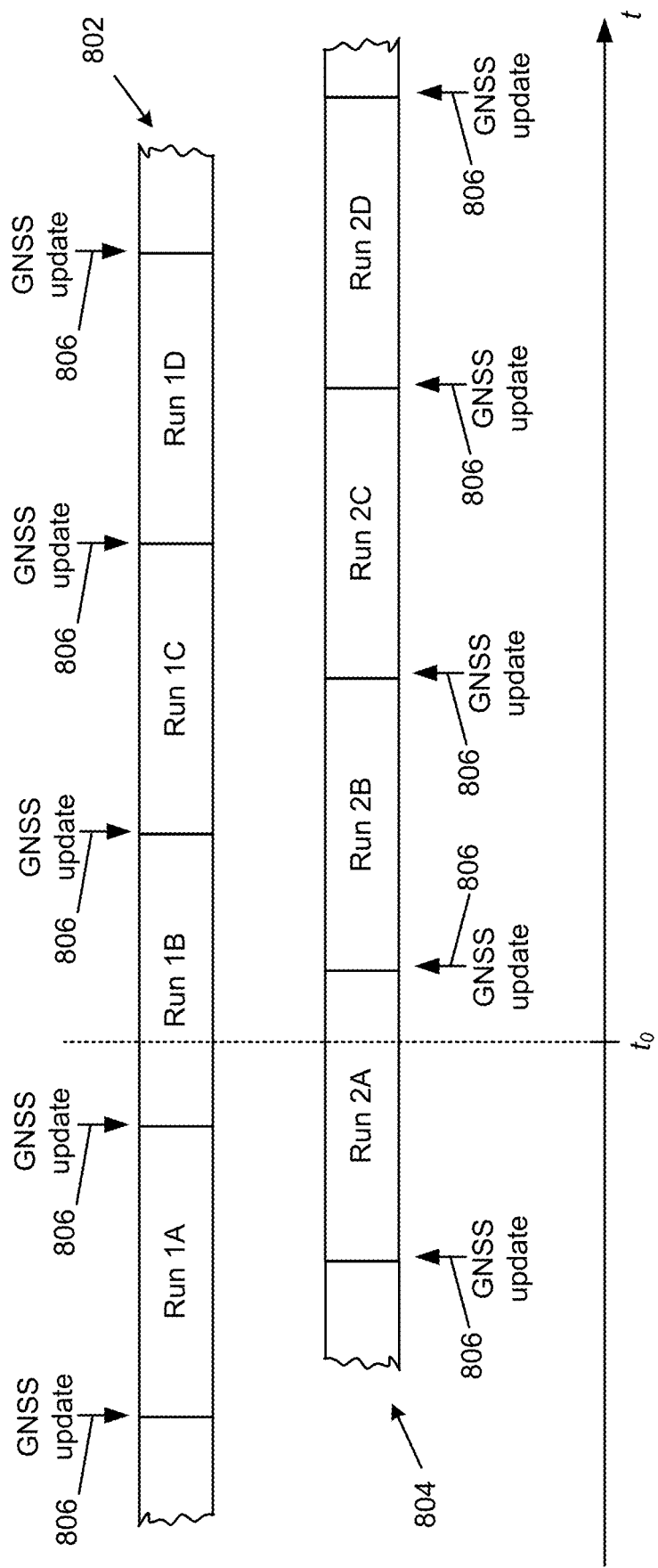
FIGS. 8A-8B show an example embodiment of vehicle state determination processing paths according to the invention.

An example embodiment, shown in FIG. 8A, may implement two vehicle state determination process paths, each based on non-GNSS sensor information. A first non-GNSS process path 802 and a second non-GNSS process path 804 are each periodically initialized 806 with GNSS data, to form a contiguous sequence of non-GNSS runs (Run 1A, 1B, 1C and 1D for the first process path 802 and Runs 2A, 2B, 2C and 2D for the second process path 804). The runs of the two process paths 802, 804 are completely reliant on non-GNSS sensor information, except for the GNSS initialization at the beginning of each run. Vehicle position information for a particular time is determined by the run most recently updated with GNSS information at the particular time. For example, at time $t_0$ shown in FIG. 8A, vehicle position information is determined according to Run 1B. The control system may store in memory the raw sensor data associated with a predetermined number of non-GNSS runs prior to the current time, in addition to the non-GNSS vehicle position determination runs themselves.

Figure 8B:
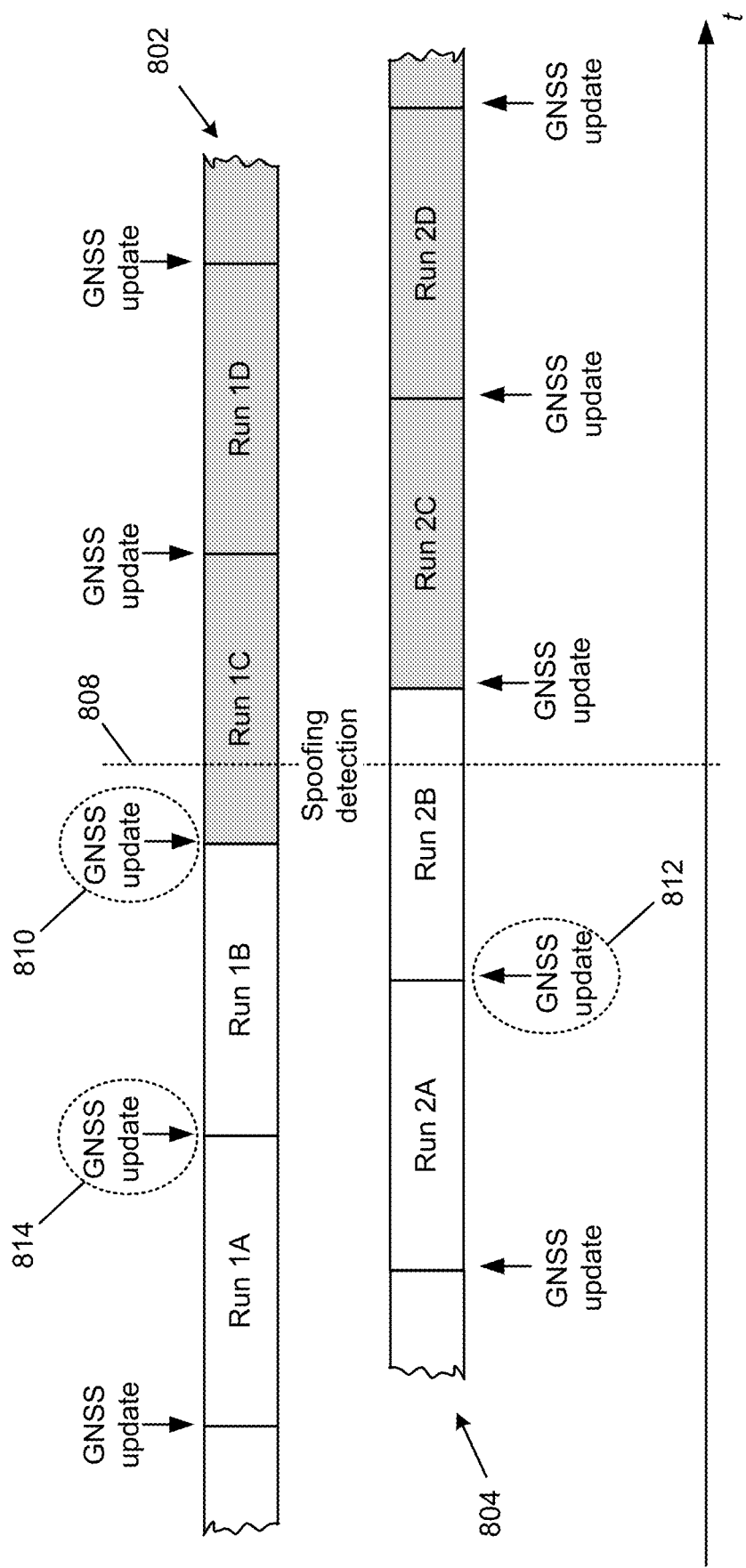

FIG. 8B illustrates an example GNSS spoofing detection 808 that occurs during Runs 1C and 2B. The control system may determine that, since the detection 808 occurs after the boundary between Runs 1B and 1C, the GNSS spoofing may have begun sometime before the GNSS update 810, such that the GNSS update 810 caused a corruption of Run 1C and subsequent runs. The potentially corrupted runs are shown in FIG. 8B with shading. The control system of this example embodiment may recall the stored raw sensor data associated with the predetermined number of prior runs, and reconstruct (i.e., re-run) the vehicle position determinations, starting from a predetermined amount of time before the spoofing was detected. In one embodiment, the control system may reconstruct the vehicle position determination runs starting with the next previous GNSS update 812. In other embodiments, the control system may reconstruct starting with an earlier point in time, for example GNSS update 814 or at some other point in time defined by a predetermined amount of time prior to the spoofing detection 808.

Some embodiments may store a single vehicle position run, along with the raw sensor data associated with the run, for a predetermined amount of time prior to the current time. Upon making a spoofing detection, the control system may reconstruct the vehicle position run using the stored raw sensor data associated with the run starting at a predetermined amount of time prior to the spoofing detection.

Figure 9:
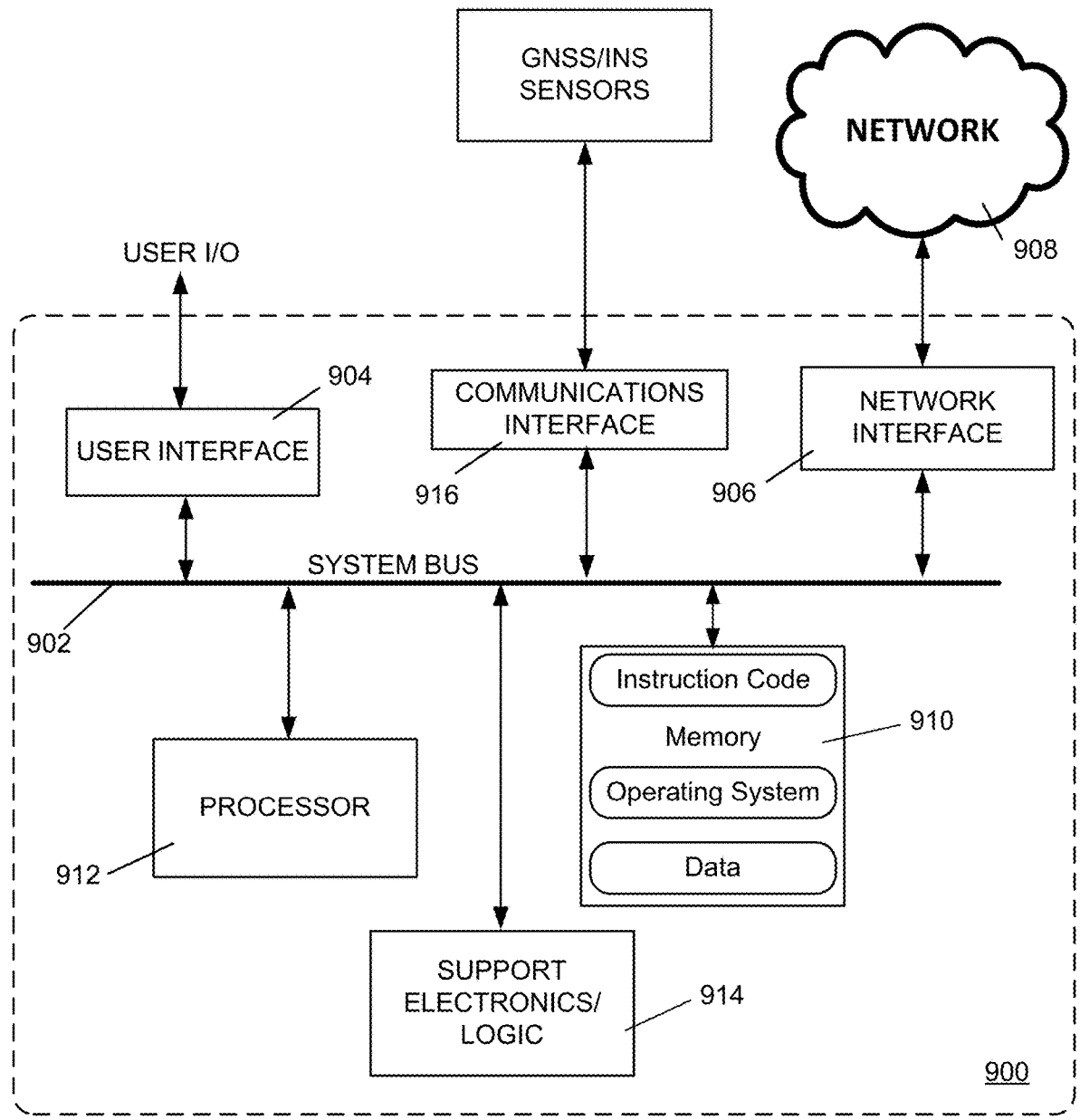
FIG. 9 is a diagram of an example internal structure of a processing system that may be used to implement one or more of the embodiments herein.

FIG. 9 is a diagram of an example internal structure of a processing system 900 that may be used to implement one or more of the embodiments herein. Each processing system 900 contains a system bus 902, where a bus is a set of hardware lines used for data transfer among the components of a computer or processing system. The system bus 902 is essentially a shared conduit that connects different components of a processing system (e.g., processor, disk storage, memory, input/output ports, network ports, etc.) that enables the transfer of information between the components.

Attached to the system bus 902 is a user I/O device interface 904 for connecting various input and output devices (e.g., keyboard, mouse, displays, printers, speakers, etc.) to the processing system 900. A network interface 906 allows the computer to connect to various other devices attached to a network 908. Memory 910 provides volatile and non-volatile storage for information such as computer software instructions used to implement one or more of the embodiments of the present invention described herein, for data generated internally and for data received from sources external to the processing system 900.

A central processor unit 912 is also attached to the system bus 902 and provides for the execution of computer instructions stored in memory 910. The system may also include support electronics/logic 1014, and a communications interface 1016. The communications interface may communicate with the GNSS system and/or the INS sensors as described herein.

In one embodiment, the information stored in memory 910 may comprise a computer program product, such that the memory 910 may comprise a non-transitory computer-readable medium (e.g., a removable storage medium such as one or more DVD-ROM's, CD-ROM's, diskettes, tapes, etc.) that provides at least a portion of the software instructions for the invention system. The computer program product can be installed by any suitable software installation procedure, as is well known in the art. In another embodiment, at least a portion of the software instructions may also be downloaded over a cable communication and/or wireless connection.

It will be apparent that one or more embodiments described herein may be implemented in many different forms of software and hardware. Software code and/or specialized hardware used to implement embodiments described herein is not limiting of the embodiments of the invention described herein. Thus, the operation and behavior of embodiments are described without reference to specific software code and/or specialized hardware—it being understood that one would be able to design software and/or hardware to implement the embodiments based on the description herein.

Further, certain embodiments of the example embodiments described herein may be implemented as logic that performs one or more functions. This logic may be hardware-based, software-based, or a combination of hardware-based and software-based. Some or all of the logic may be stored on one or more tangible, non-transitory, computer-readable storage media and may include computer-executable instructions that may be executed by a controller or processor. The computer-executable instructions may include instructions that implement one or more embodiments of the invention. The tangible, non-transitory, computer-readable storage media may be volatile or non-volatile and may include, for example, flash memories, dynamic memories, removable disks, and non-removable disks.

While example embodiments have been particularly shown and described, it will be understood by those skilled in the art that various changes in form and details may be made therein without departing from the scope of the embodiments encompassed by the appended claims.

What is claimed is:

1. A method of detecting and mitigating Global Navigation Satellite System (GNSS) spoofing events, comprising:
   determining a first vehicle state based on information from an Inertial Navigation System (INS) without GNSS input;
   determining a second vehicle state based on information from an INS with GNSS input;
   comparing the first vehicle state and the second vehicle state; and
   when a difference between the first vehicle state and the second vehicle state exceeds a predetermined threshold:
   (i) concluding that GNSS spoofing is present; and
   (ii) utilizing only the first vehicle state as a correct vehicle state.

2. The method of claim 1, further comprising implementing at least one vehicle state processing path, each of the at least one vehicle state processing path comprising two or more consecutive processing runs based on INS sensor information.

3. The method of claim 2, further comprising initializing each of the two or more consecutive processing runs with the GNSS input.

4. The method of claim 2, further comprising reevaluating at least one vehicle state processing path, when the difference between the first vehicle state and the second vehicle state exceeds a predetermined threshold, to extricate a GNSS component from the processing path to at least a predetermined amount of time prior to when the GNSS spoofing was concluded to be present.

5. The method of claim 2, wherein the at least one vehicle state processing path is a first processing path and a second processing path, the first processing path staggered in time with respect to the second processing path.

6. The method of claim 1, further comprising:
at a vehicle:
  transmitting (i) the information from the INS without GNSS input, and (ii) the information from the INS with GNSS input, to an off-board control subsystem;
at the off-board control subsystem:
  determining the first vehicle state and the second vehicle state;
  comparing the first vehicle state and the second vehicle state; and
  when a difference between the first vehicle state and the second vehicle state exceeds a predetermined threshold, determining a result comprising:
    (a) concluding that GNSS spoofing is present; and
    (b) utilizing only the first vehicle state as a correct vehicle state; and
  conveying the result to the vehicle.

7. The method of claim 1, wherein concluding that GNSS spoofing is present further comprises determining that a running mean acceleration difference between a vehicle odometer-based acceleration measurement and a GNSS-based acceleration measurement exceeds a predetermined threshold.

8. A system for detecting and mitigating Global Navigation Satellite System (GNSS) spoofing events, comprising:
a processor; and
a memory with computer code instructions stored thereon, the memory operatively coupled to the processor such that, when executed by the processor, the computer code instructions cause the system to:
  determine a first vehicle state based on information from an Inertial Navigation System (INS) without GNSS input;
  determine a second vehicle state based on information from an INS with GNSS input;
  compare the first vehicle state and the second vehicle state;
  when a difference between the first vehicle state and the second vehicle state exceeds a predetermined threshold:
    (i) conclude that GNSS spoofing is present; and
    (ii) utilize only the first vehicle state as a correct vehicle state.

9. The system of claim 8, wherein the executed code instructions further cause the system to implement at least one vehicle state processing path, each of the at least one vehicle state processing path comprising two or more consecutive processing runs based on INS sensor information.

10. The system of claim 9, wherein the executed code instructions further cause the system to initialize each of the two or more consecutive processing runs with the GNSS input.

11. The system of claim 9, wherein the executed code instructions further cause the system to reevaluate at least one vehicle state processing path, when the difference between the first vehicle state and the second vehicle state exceeds a predetermined threshold, to extricate a GNSS component from the processing path to at least a predetermined amount of time prior to when the GNSS spoofing was concluded to be present.

12. The system of claim 9, wherein the at least one vehicle state processing path is a first processing path and a second processing path, the first processing path staggered in time with respect to the second processing path.

13. The system of claim 8, wherein (i) the information from the INS without GNSS input, and the information from the INS with GNSS input, are determined at the vehicle, (ii) the vehicle transmits the information from the INS without GNSS input, and the information from the INS with GNSS input, to the off-board control subsystem, (iii) the off-board control subsystem (a) determines the first vehicle state and the second vehicle state, (b) compares the first vehicle state and the second vehicle state, and (c) when a difference between the first vehicle state and the second vehicle state exceeds a predetermined threshold, determines a result comprising concluding that GNSS spoofing is present and utilizing only the first vehicle state as a correct vehicle state, and (d) conveying the result to the vehicle.

14. The system of claim 8 wherein the system concludes that GNSS spoofing is present by a determination that a running mean acceleration difference between a vehicle odometer-based acceleration measurement and a GNSS-based acceleration measurement exceeds a predetermined threshold.

15. A non-transitory computer-readable medium with computer code instruction stored thereon, the computer code instructions, when executed by a processor, cause an apparatus to:
  determine a first vehicle state based on information from an Inertial Navigation System (INS) without GNSS input;
  determine a second vehicle state based on information from an INS with GNSS input;
  compare the first vehicle state and the second vehicle state;
  when a difference between the first vehicle state and the second vehicle state exceeds a predetermined threshold:
    (i) conclude that GNSS spoofing is present; and
    (ii) utilize only the first vehicle state as a correct vehicle state.

16. The non-transitory computer-readable medium of claim 15, wherein the computer code instructions, when executed by a processor, further cause the apparatus to conclude that GNSS spoofing is present by determining that a running mean acceleration difference between a vehicle odometer-based acceleration measurement and a GNSS-based acceleration measurement exceeds a predetermined threshold.

17. The non-transitory computer-readable medium of claim 16, wherein the computer code instructions, when executed by a processor, further cause the apparatus to implement at least one vehicle state processing path, each of the at least one vehicle state processing path comprising two or more consecutive processing runs based on INS sensor information.

18. The non-transitory computer-readable medium of claim 16, wherein the computer code instructions, when executed by a processor, further cause the apparatus to initialize each of the two or more consecutive processing runs with the GNSS input.

19. The non-transitory computer-readable medium of claim 16, wherein the computer code instructions, when executed by a processor, further cause the apparatus to reevaluate at least one vehicle state processing path, when the difference between the first vehicle state and the second vehicle state exceeds a predetermined threshold, to extricate a GNSS component from the processing path to at least a predetermined amount of time prior to when the GNSS spoofing was concluded to be present.

20. The non-transitory computer-readable medium of claim 16, wherein the computer code instructions, when executed by a processor, further cause the apparatus to stagger a first processing path in time with respect to a second processing path, wherein the at least one vehicle state processing path is instantiated as the first processing path and the second processing path.

\* \* \* \* \*